(12) United States Patent
Xuan et al.

(10) Patent No.: US 10,171,502 B2
(45) Date of Patent: Jan. 1, 2019

(54) MANAGED APPLICATIONS

(71) Applicant: AirWatch LLC, Atlanta, GA (US)

(72) Inventors: Chaoting Xuan, Duluth, GA (US); Erich Stuntebeck, Marietta, GA (US)

(73) Assignee: AIRWATCH LLC, Atlanta, GA (US)

( * ) Notice: Subject to any disclaimer, the term of this patent is extended or adjusted under 35 U.S.C. 154(b) by 0 days.

(21) Appl. No.: 14/718,727

(22) Filed: May 21, 2015

(65) Prior Publication Data
US 2016/0344771 A1 Nov. 24, 2016

(51) Int. Cl.
H01L 29/06 (2006.01)
G06F 21/62 (2013.01)
H04L 29/06 (2006.01)
G06F 21/55 (2013.01)

(52) U.S. Cl.
CPC .......... H04L 63/20 (2013.01); G06F 21/554 (2013.01); G06F 21/6218 (2013.01); H04L 63/10 (2013.01)

(58) Field of Classification Search
CPC ............ G06F 21/6218; G06F 3/04817; G06F 21/577; G06F 21/60; G06F 21/554; H04L 63/20; H04L 63/02; H04L 63/10
USPC .................................. 726/1, 21–22
See application file for complete search history.

(56) References Cited

U.S. PATENT DOCUMENTS

| 5,581,702 | A | 12/1996 | McArdle | |
|---|---|---|---|---|
| 6,151,606 | A | 11/2000 | Mendez | |
| 7,545,931 | B2 | 6/2009 | Dillaway | |
| 8,225,311 | B1* | 7/2012 | Robertson | G06F 8/65 717/168 |
| 8,613,070 | B1 | 12/2013 | Borzycki | |
| 8,621,606 | B1* | 12/2013 | Ferrie | G06F 21/57 713/164 |
| 8,892,876 | B1* | 11/2014 | Huang | G06F 21/6209 713/165 |
| 9,112,749 | B2* | 8/2015 | Dabbiere | G06F 21/60 |
| 9,785,425 | B2* | 10/2017 | Dabbiere | G06F 8/63 |
| 2003/0065722 | A1 | 4/2003 | Ieperen | |
| 2007/0124373 | A1 | 5/2007 | Chatterjee | |
| 2008/0148298 | A1* | 6/2008 | Chatterjee | G06F 21/54 719/328 |
| 2010/0024036 | A1 | 1/2010 | Morozov | |
| 2010/0175104 | A1* | 7/2010 | Khalid | G06F 9/545 726/1 |
| 2010/0306773 | A1 | 12/2010 | Lee et al. | |
| 2012/0047580 | A1* | 2/2012 | Smith | G06F 21/53 726/24 |
| 2012/0102483 | A1 | 4/2012 | Goldman | |

(Continued)

OTHER PUBLICATIONS

William Enck et al, Understanding Android Security,pp. 50-57, IEEE Computer Society, 2009.*

(Continued)

Primary Examiner — Shanto Abedin
(74) Attorney, Agent, or Firm — Thomas | Horstemeyer, LLP; Arvind R. Reddy; Jason M. Perilla

(57) ABSTRACT

Embodiments relate to a system that includes a computing device and a managed application executable by the computing device. The managed application initiates an execution of a target application. The managed application obtains a request from the target application to perform an action. The managed application determines whether the action is permitted by a compliance rule.

20 Claims, 12 Drawing Sheets

(56) References Cited

U.S. PATENT DOCUMENTS

| | | |
|---|---|---|
| 2012/0246286 A1 | 9/2012 | Zhong |
| 2013/0091543 A1* | 4/2013 | Wade ................. G06F 21/54 726/1 |
| 2013/0232573 A1* | 9/2013 | Saidi ............... G06F 21/6218 726/22 |
| 2013/0312057 A1* | 11/2013 | Dabbiere ............. G06F 21/60 726/1 |
| 2013/0332723 A1 | 12/2013 | Tan et al. |
| 2014/0007183 A1 | 1/2014 | Qureshi et al. |
| 2014/0007222 A1 | 1/2014 | Qureshi et al. |
| 2014/0032759 A1 | 1/2014 | Barton et al. |
| 2014/0040978 A1* | 2/2014 | Barton ................. H04L 63/20 726/1 |
| 2014/0059642 A1 | 2/2014 | Deasy |
| 2014/0109078 A1* | 4/2014 | Lang .................... G06F 8/52 717/172 |
| 2014/0137115 A1 | 5/2014 | Tosa et al. |
| 2014/0282821 A1* | 9/2014 | Adler ................. H04L 63/10 726/1 |
| 2014/0344878 A1 | 11/2014 | Brown |
| 2014/0351220 A1 | 11/2014 | Debate |
| 2015/0047030 A1 | 2/2015 | Erlingsson |
| 2015/0089224 A1 | 3/2015 | Beckman et al. |
| 2015/0089577 A1* | 3/2015 | Beckman ............. H04L 63/105 726/1 |
| 2015/0235042 A1 | 8/2015 | Salehpour et al. |
| 2015/0254457 A1 | 9/2015 | Wade |
| 2015/0309811 A1 | 10/2015 | Wisgo |
| 2016/0147982 A1 | 5/2016 | Sedayao et al. |
| 2016/0266880 A1 | 9/2016 | Chang et al. |
| 2016/0323381 A1 | 11/2016 | Huang et al. |

OTHER PUBLICATIONS

International Search Report dated Aug. 16, 2016 for PCT/US2016/033560.
Office Action dated Jan. 17, 2017 for U.S. Appl. No. 14/718,694.
Office Action dated Apr. 20, 2017 for U.S. Appl. No. 14/718,733.
Office Action dated Oct. 18, 2017 for U.S. Appl. No. 14/718,694.
Office Action dated Jul. 26, 2017 for U.S. Appl. No. 14/718,694.
Office Action dated Feb. 21, 2018 for U.S. Appl. No. 14/718,694.
Office Action dated Nov. 3, 2017 for U.S. Appl. No. 14/718,733.
Office Action dated Apr. 25, 2018 for U.S. Appl. No. 14/718,733.
Notice of Allowance dated for U.S. Appl. No. 14/718,694.

* cited by examiner

MANAGED APPLICATIONS

BACKGROUND

Enterprises, such as businesses and other organizations, typically enact security policies that prevent unauthorized users from accessing enterprise computing resources. For example, some security policies require a user to provide credentials that must be authenticated before the user is granted access to enterprise data.

When a user operates a device to access an enterprise resource, the device can include several applications that perform various types of functions. For example, a device can include a web browser application, an email application, a word processor application, and game applications. Often times, these applications are obtained from application developers that have no affiliation with the users of the client devices or the enterprises that provide enterprise resources. Some enterprises have become concerned that applications installed on devices could introduce security vulnerabilities that could be exploited to facilitate unauthorized users accessing enterprise resources.

To enhance the security of applications installed in devices, some enterprises provide software development kits (SDKs) to application developers. These SDKs provide application developers a development environment that facilitates integrating security libraries into applications so that the developers can add security and management capabilities to the application. Using an SDK, application developers can modify the source code of their applications to include the security libraries that are provided by the SDK. However, the modified code has to be rebuilt and redistributed.

In another approach, the security of an application can be enhanced through a process known as "wrapping." To wrap an application, the application is first decompiled. Security libraries are inserted into the decompiled application, and the application is then compiled with the added security libraries. However, wrapping requires access to modify and repackage an application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to enhancing the security of applications that can be installed in client devices. In some examples, an enterprise computing environment can obtain an application package for a target application that is distributed through an application repository. The enterprise computing environment can generate a managed application package based on the application package for the target application and provide the managed application package to client devices. The managed application package can be installed in a client device to create a managed application. When the managed application is executed in the client device, a loader in the managed application can initiate the execution of the target application in the client device.

The managed application can include an enforcer that determines whether the target application is executing in compliance with compliance rules that are specified by the enterprise computing environment. For example, the enforcer in the managed application can detect that the target application is attempting to delete a particular file. If a compliance rule prohibits the target application from performing this operation, the enforcer can prohibit the operation from being performed and can also notify an administrator that the client device 106 has attempted to perform an unauthorized action.

In some examples, a workspace manager can also execute in a client device and create a virtual workspace in which resources from another workspace are isolated from the workspace that is created by the workspace manager. For example, the workspace manager can create and manage an enterprise workspace that is isolated from a personal workspace in the client device. Because multiple workspaces exist in the client device, multiple instances of a particular application can execute in the client device. In addition, components, such as other applications, that are not operating in the enterprise workspace can be prohibited from accessing resources in the enterprise workspace.

In the following discussion, examples of systems and their components are described, followed by examples of the operation of those systems.

Figure 1:
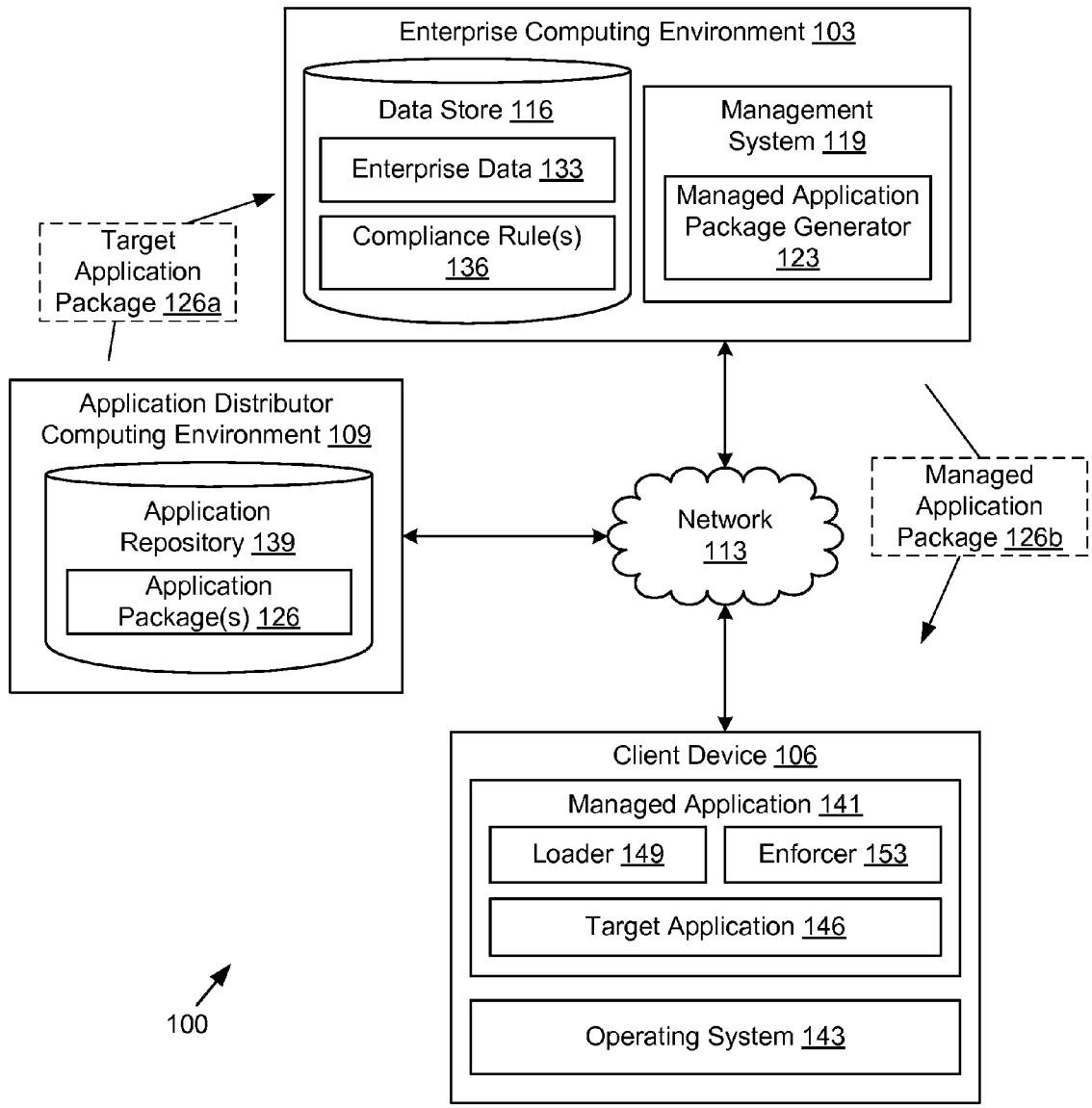
FIG. 1 is a drawing of an example of a networked environment.

With reference to FIG. 1, shown is an example of a networked environment 100. The networked environment 100 can include an enterprise computing environment 103, a client device 106, and an application distributor computing environment 109, which are in data communication through a network 113. The network 113 can include the Internet, one or more intranets, extranets, wide area networks (WANs), local area networks (LANs), wired networks, wireless networks, or any combination of two or more such networks. The network 113 can include satellite networks, cable networks, Ethernet networks, and telephony networks.

The enterprise computing environment 103 can be a computing environment that is operated by an enterprise, such as a business or other organization. The enterprise computing environment 103 can include a computing device, such as a server computer, that provides computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, vary over time. In other examples, the enterprise computing environment 103 can include or be operated as one or more virtualized computer instances that can be executed in order to perform the functionality that is described herein.

The enterprise computing environment 103 can execute various systems. In addition, a data store 116 that is accessible to the enterprise computing environment 103 can store various data. For example, the enterprise computing environment 103 can include a management system 119 that can monitor and manage the operation of multiple client devices 106 that are associated with the enterprise computing environment 103. In particular, the management system 119 can manage and oversee the operation of multiple client devices 106 that are enrolled in a management service that is facilitated by the management system 119. In one example, an employer can operate the management system 119 to ensure that the client devices 106 of its employees are operating in compliance with various security policies. By the employer ensuring that the client devices 106 of its employees are operating in compliance with the security policies, the employer can control and restrict access to resources associated with the employer as well as the users of the client devices 106. The management system 119 can also facilitate access to email, calendar data, contact information, and other enterprise resources associated with the enterprise.

The management system 119 can also include a managed application package generator 123. As will be described in further detail below, the managed application package generator 123 can obtain an application package 126, such as a target application package 126a from the application distributor computing environment 109, and can then generate a managed application package 126b based on the target application package 126a. Although the managed application package generator 123 is shown in FIG. 1 as being implemented in the enterprise computing environment 103, in alternative examples, the client device 106 can implement the managed application package generator 123 so that the client device 106 can generate a managed application package 126b based on a target application package 126a.

The data store 116 shown in FIG. 1 is representative of multiple data stores 116 that can be accessible to components of the enterprise computing environment 103. The data stored in the data store 116 can include enterprise data 133 and compliance rules 136. The enterprise data 133 stored in the data store 116 can include information associated with the enterprise that operates the enterprise computing environment 103. For example, the enterprise data 133 can include personnel records, accounting records, word processing documents, spreadsheets, and other data that is associated with the enterprise.

A compliance rule 136 can specify whether a component in the client device 106 is prohibited from performing one or more actions. For example, a compliance rule 136 can specify whether a component in a client device 106 is permitted to request access to a particular device component, such as a camera, global positioning system (GPS), or network interface. As another example, a compliance rule 136 can specify whether a component in a client device 106 is permitted to perform a particular operation, such as clipboard operation in which content is copied or pasted. As another example of an operation that can be prohibited, a compliance rule 136 can specify whether a component in a client device 106 is permitted to request to delete a file.

Some compliance rules 136 can specify that actions are permitted based on various conditions, such as the time or location of the client device 106. For example, a compliance rule 136 can specify that a particular action is permitted only if the client device 106 is located within a particular geographic boundary or connected to the network 113 through a particular network access point.

The application distributor computing environment 109 can be a computing environment operated by an entity that distributes applications packages 126. In some examples, the application packages 126 can include ANDROID application package (APK) files. The entity that operates the application distributor computing environment 109 and distributes the application packages 126 may or may not be affiliated with the enterprise that operates the enterprise computing environment 103 or the user of the client device 106. The enterprise computing environment 103 can include a computing device, such as a server computer, that provides computing capabilities for the enterprise computing environment 103.

The application distributor computing environment 109 can include an application repository 139 in which the application packages 126 are stored. In some examples, the application repository 139 can be a public repository that can be accessed by devices, such as the client devices 106 and devices in the enterprise computing environment 103. In other examples, the application repository 139 can be a private repository that can be accessed only by particular devices, such as client devices 106 or other devices in the enterprise computing environment 103 that have registered for service with the application distributor computing environment 109.

The client device 106 is representative of multiple client devices 106 that can be coupled to the network 113. The client device 106 can include a processor-based computer system, such as a desktop computer, a laptop computer, a personal digital assistant, a mobile phone, a web pad, or a tablet computer. The client device 106 can also include output devices, such as a display and audio speakers, as well as one or more input devices, such as a mouse, keyboard, touch pad, or touch screen, which facilitate a user interacting with and controlling the client device 106.

The client device 106 can include a managed application 141. In addition, the client device 106 can include an operating system 143, which facilitates execution of the managed application 129 and other components in the client device 106. The operating system 143 can manage hardware and software resources for the client device 106 when the client device 106 executes various components. In addition, the operating system 143 can provide a virtual machine that executes application in the client device 106. For example, upon execution of the managed application 141, the operating system 143 can create an instance of a virtual machine that interprets executables, such as bytecode, for the application. In some examples, the operating system 143 can include the ANDROID operating system, which can provide instances of a DALVIK virtual machine, ANDROID RUNTIME (ART), or another virtual machine or interpreter for interpreting JAVA bytecode and executing native code, such as compiled C/C++ code.

The operating system 143 can also provide various types of systems, such as an interprocess communication component. The interprocess communication component can facilitate applications, services, and systems within the client device 106 communicating with each other.

The managed application 141 can be an application that is created in the client device 106 upon a managed application package 126b being installed in the client device 106. The managed application 141 can initiate the execution of a target application 146 in the client device 106 and determine whether the target application 146 is executing in compliance with the compliance rules 136 that have been assigned to the client device 106. As will be described in further detail below, from the perspective of a user of the client device 106, the operation of the managed application 129 can appear to be identical to the operation of the target application 146 except that the managed application 141 can restrict some functionality of the target application 146 if the functionality violates a compliance rule 136. The target application 146 can be executed, and without modifying the target application 146, controlled during execution. The target application 146 need not use an SDK or be wrapped, in some examples, to execute in accordance with compliance rules 136.

To initiate the execution of a target application 146, the managed application can include a loader 149. As will be described in the further detail below, the loader can cause the target application 146 to begin executing in the client device 106. The loader 149 can execute transparently to the target application 146.

To determine whether the target application 146 is operating in compliance with the compliance rules 136, the managed application 129 can include an enforcer 153. As will be described in further detail below, the enforcer 153 can intercept messages to and from the target application 146 and parse the messages to determine whether the target application 146 is requesting a particular action to be performed. In addition, the enforcer 153 can determine whether a requested action violates a compliance rule 136. The enforcer 153 can execute transparently to the target application 146.

If the enforcer 153 determines that a compliance rule 136 has been violated, the enforcer 153 can also initiate a remedial action. Examples of remedial actions include discarding a message that requests a prohibited action to be performed, notifying a user of the client device 106 of a violation of a compliance rule 136, notifying an administrator of the enterprise computing environment 103 of a violation of a compliance rule 136, and erasing data in the client device 106.

Figure 2:
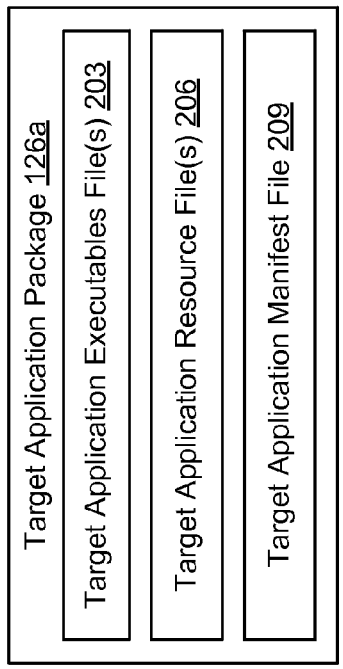
FIG. 2 is a drawing of an example of a target application package.

With reference to FIG. 2, shown is an example of a target application package 126a for the target application 146 that can be distributed by the application repository 139 and obtained by the managed application package generator 123. In some examples, the target application package 126a can include an APK file. The target application package 126a can include a target application executables file 203, a target application resource file 206, and a target application manifest file 209.

A target application executables file 203 can include code for the target application 146 that is executable in the client device 106. For example, a target application executables file 203 can include bytecode, such as compiled JAVA bytecode, or native code, such as compiled C/C++ code. A virtual machine in the client device 106 can interpret the bytecode in the executables file, and the native code can be executed by interacting with system libraries in the client device 106.

A target application resource file 206 can include resources that can be used to execute the target application 146. Some of the resources in the target application resource file 206 can be public resources. In this regard, public resources can be resources that are used by components other than the target application 146, such as system services. For example, a public resource can include a launcher icon that is rendered in the home screen of a device. Because components other than the target application 146 can use the launcher icon, the launcher icon can be a public resource.

A target application manifest file 209 can include configuration information for the target application 146. In some examples involving the ANDROID operating system, the target application manifest file 209 can include an AndroidManifest.xml file. The target application manifest file 209 can describe the functionality of the target application 146 as well as the resources and permissions that are used to execute the target application 146. For example, the target application manifest file 209 can include an identifier for the target application 146 in addition to identifiers for various components that are used to execute the target application 146.

Figure 3:
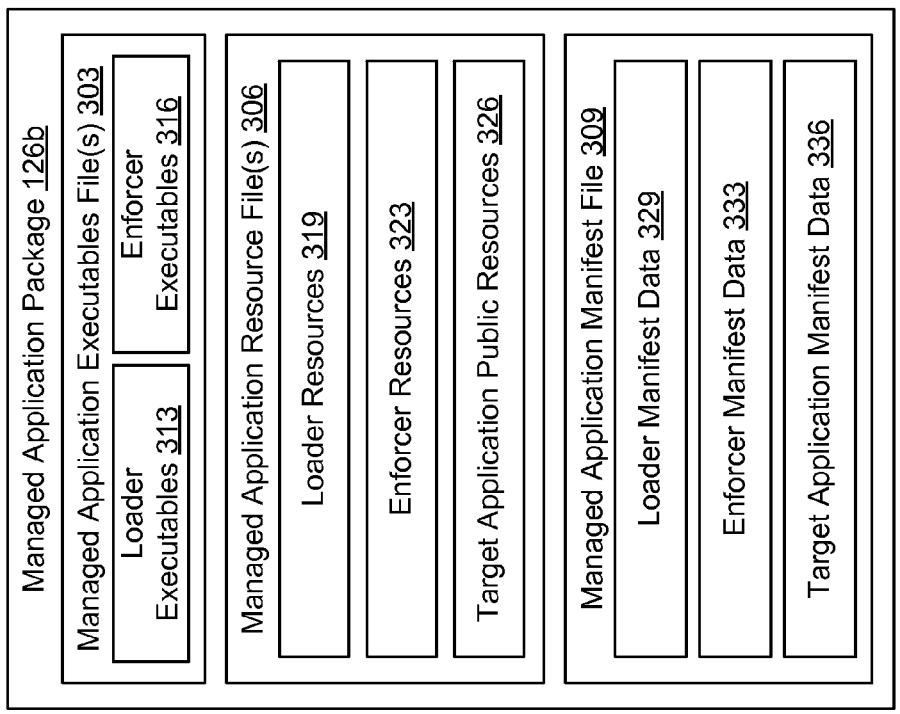
FIG. 3 is a drawing of an example of a managed application package.

With reference to FIG. 3, shown is an example of a managed application package 126b for the managed application 141 that can be generated by the managed application package generator 123. In examples involving the ANDROID operating system, the managed application package 126b can include an APK file. The managed application package generator 123 can include a managed application executables file 303, a managed application resource file 306, and a managed application manifest file 309.

The managed application executables file 303 can include code for the managed application 141 that is executable in the client device 106. For example, a managed application executables file 303 can include loader executables 313 and enforcer executables 316 that execute functionality of the loader 149 and the enforcer 153, respectively. In addition, the managed application executables file 303 can include executables for an initiator component that causes the loader 149 and the enforcer 153 to be created when the managed application 141 begins execution. The loader executables 313, enforcer executables 316, and initiator component can include bytecode that can be interpreted by a virtual machine in the client device 106 or native code that can be executed by interacting with system libraries in the client device 106.

A managed application resource file 306 can include resources that can be used to execute the managed application 141. For example, the managed application resource file 306 can include loader resources 319 and enforcer resources 323 that are used to execute the loader 149 and the enforcer 153, respectively. In addition, the managed application resource file 306 can include target application public resources 326, which can include the public resources in the target application resource file 206. For example, the launcher icon for the target application 146 can be included in the managed application resource file 306.

The managed application manifest file 309 can include loader manifest data 329 and enforcer manifest data 333 for the loader 149 and enforcer 15, respectively. In addition, the managed application manifest file 309 can include target application manifest data 336. The target application manifest data 336 can include all of the data from the target application manifest file 209, including an identification of the resources and permissions for the target application 146.

The managed application manifest file 309 can also define an initiator component for the managed application 141. The initiator component can load the loader 149 and the enforcer 153 for the managed application 141. For examples involving the ANDROID operating system, the managed application manifest file 309 can be an AndroidManifest.xml file, and the AndroidManifest.xml file can define the initiator component as a subclass of the android.app.Application class in the android:name attributes of the <application> tag.

Next, examples of the managed application package generator 123 creating a managed application package 126b are described. In the following description, the managed application package 126 has not yet been generated, and the managed application 129 has not yet been installed in the client device 106.

To begin generating the managed application package 126b, the managed application package generator 123 can obtain a target application package 126a from the application repository 139. In some examples, the managed application package generator 123 can obtain the target application package 126a in response to a request from a user of a client device 106. For example, if a user of the client device 106 wants to install the target application 146 on the client device 106, the user can submit a request for the enterprise computing environment 103 to obtain the target application package 126a and can generate a corresponding managed application package 126b. In other examples, the managed application package generator 123 can obtain the target application package 126a in response to a request from an administrator of the enterprise computing environment 103.

After the managed application package generator 123 has obtained the application package 126 for the target application 146, the managed application package generator 123 can generate the managed application executables file 303, the managed application resource file 306, and the managed application manifest file 309 for the managed application package 126b. The managed application executables file 303, the managed application resource file 306, and the managed application manifest file 309 can include the respective components that are described above.

After the managed application package generator 123 has generated the managed application executables file 303, the managed application resource file 306, and the managed application manifest file 309, the managed application package generator 123 can package these files into a managed application package 126b. The management system 119 can then transmit the managed application package 126b along with the target application package 126a to the client device 106. In one example, the management system 119 can transmit the managed application package 126b along with the target application package 126a to the client device 106 in response to receiving a request from the client device 106 for the managed application package 126b. In other examples, the management system 119 can transmit the managed application package 126b along with the target application package 126a to the client device 106 automatically in response to various actions, such as a request from an administrator of the enterprise computing environment 103. In one such example, the management system 119 can push the managed application package 126b and target application package 126a to the client device 106 automatically in response to a request from an administrator of the enterprise computing environment 103.

Next, examples of the installation and operation of the managed application 141 are described. Once the client device 106 has obtained the managed application package 126b and the target application package 126a, the client device 106 can store the target application package 126a in local storage and install the managed application package 126b to thereby generate the managed application 141. When the client device 106 installs the managed application 141, the launcher icon for the target application 146 can be extracted from the managed application resource file 306 of the managed application package 126b. The client device 106 can include a rendering of the launcher icon in a user interface for a home screen or in other user interfaces that represent the applications installed in the client device 106. Because the launcher icon for the target application 146 can be included in a user interface that represents the installed application, the target application 146 can appear to be installed in the client device 106, even though it is the managed application 141 that has been installed in the client device 106.

A user can cause the managed application 141 to begin executing in various ways. In one example, the user can use an input device, such as a touch screen or touch pad, to select the launcher icon that is included in the home screen of the client device 106. When the user selects the launder icon, the operating system 143 can begin executing the managed application 141. To this end, the operating system 143 can instantiate a virtual machine through which the managed application 141 executes. In some examples involving the ANDROID operating system, the operating system 143 can create an instance of a DALVIK virtual machine that executes the managed application 141.

When the managed application 141 begins executing, the managed application 141 can first execute the initiator component that loads the loader 149 and the enforcer 153. For examples involving the ANDROID operating system, prior to executing other components of a particular application, the operating system 143 can first instantiate a subclass of the android.app.Application class that is defined in the android:name attributes of the <application> tag in the AndroidManifest.xml file. Accordingly, the initiator component in examples involving the ANDROID operating system can include a subclass of the android.app.Application class defined in the android:name attributes of the <application> tag so that the operating system 143 begins executing the initiator component before other components of the managed application 141. When the initiator component executes, the initiator component can cause the loader 149 and the enforcer 153 to begin executing.

Once the loader 149 in the managed application 141 begins executing, the loader 149 can load the target application 146 into memory in the client device 106. For example, the loader 149 can load the executables in the target application executables file 203 and facilitate the target application 146 accessing resources in the target application resource file 206. For examples involving the ANDROID operating system, the loader 149 can load the executables for the target application 146 by creating a class loader object, such as a global java.lang.ClassLoader object, that loads the executables included in the target application executables file 203 of the target application 146 through the dalvik.system.DexClassLoader class loader. In addition, the loader 149 can instrument the android.app.LoadedApk.get-ClassLoader method to return the global java.lang.ClassLoader object to the target application 146.

To facilitate the target application 146 accessing resources in the target application resource file 206, the loader 149 can intercept messages from the target application 146 requesting resources in the target application resource file 206 and return to the target application 146 a path that points to the storage location of the target application package 126a. In examples involving the ANDROID operating system, the target application 146 can request resources in the target application resource file 206 by issuing the android.app.ResourceManager.getTopLevelResources call. In these examples, the loader 149 can intercept this call and return to the target application 146 the storage location of the target application package 126a, which can include the "/data/app/" directory for the client device 106. In this way, the loader 149 can initiate execution of the target application 146, and the target application 146 can access the resources in the target application package 126a during execution.

When the target application 146 is executing, the target application 146 can request process information for itself. For instance, in examples involving the ANDROID operating system, the target application 146 can issue the android.app.Activity.getApplication, android.app.Service.getApplication, or android.app.ContexImpl.getApplicationContext calls. In some examples, the loader 149 can intercept a request from the target application 146 for process information and return to the target application 146 an object that identifies the target application 146. If the loader 149 did not intercept such a request for process information, the operating system 143 could return an object that identifies the initiator component that loaded the loader 149 and enforcer 153, which could result in the target application 146 malfunctioning. Thus, intercepting a request for process information and returning an object that identifies the target application 146 can facilitate the intended execution of the target application 146.

While the target application 146 executes in the client device 106, the enforcer 153 of the managed application 141 can monitor the execution of the target application 146 and can determine whether the target application 146 is violating any compliance rules 136 that have been assigned to the client device 106. To monitor the execution of the target application 146 and to enforce the compliance rules 136, the enforcer 153 can intercept messages sent from the target application 146 and can parse the messages to identify whether the target application 146 is attempting to perform an action that violates a compliance rule 136. If the request to perform the action does not violate a compliance rule 136, the enforcer 153 can forward the request to the operation system 143. Otherwise, if the request to perform an action does violate a compliance rule 136, the enforcer can discard the request. In this way, the enforcer 153 can prevent the target application 146 from performing a prohibited action.

As an example that involves the ANDROID operating system, the target application 146 can issue the java.io.File.delete call with an identifier for a particular file as a parameter of the call. The enforcer 153 can intercept this call and determine that the target application 146 is attempting to delete the identified file. The enforcer 153 can then compare the requested action to the compliance rules 136 to determine whether the target application 146 is permitted to delete the file. If the enforcer 153 determines that the target application 146 is permitted to delete the file, the enforcer 153 can forward the java.io.File.delete call to the operating system 143, and the operating system 143 can delete the identified file. Otherwise, if the enforcer 153 determines that the target application 146 is not permitted to delete the file, the enforcer 153 can return a "false" object to target application 146, which indicates to the target application 146 that the requested operation failed. In this way, the enforcer 153 can prevent the target application 146 from deleting a file if the target application 146 is not permitted to delete the file.

In some examples, the enforcer 153 can implement hooking functions to intercept requests from the target application 146 and can enforce the compliance rules 136. For examples involving the ANDROID operating system, if the target application 146 uses JAVA bytecode executed through a virtual machine to request an action to be performed, the enforcer can find the JAVA method object that corresponds to the request and change the method object's access flags from being native access flags to non-native access flags. In addition, the enforcer 153 can modify the native code pointer of the JAVA method so that the pointer refers to the address of a hooking function. Based on whether the request violates a compliance rule 136, the hooking function to which the pointer refers can either call the JAVA method requested by the target application 146 or deny the request.

If the target application 146 uses native code to request an action to be performed, the enforcer 153 can implement hooking functions by modifying the addresses of particular target functions that can be called by the native code. Examples of such target functions include game engine functions and simulation engine functions. When the loader 149 loads the native code for a target application 146 into memory, the enforcer 153 can locate the global offset table (GOT) for the native code that includes a list of addresses of target functions. For each target function in the GOT, the enforcer 153 can determine whether that function is subject to a compliance rule 136. If a target function is subject to a compliance rule 136, the enforcer 153 can replace the target function with a hooking function that can either permit or deny the action that the native code requests to perform.

In some examples, if the enforcer 153 detects that the target application 146 is attempting to perform an action that violates a compliance rule 136, the enforcer can also initiate an action. For example, the enforcer 153 can transmit a message to the management system 119 to notify an administrator of the enterprise computing environment 103 that the target application 146 has attempted to perform an action that violates the compliance rule 136. In addition, the enforcer 153 can generate a message in the client device 106 to notify the user of the client device 106 that the target application 146 has attempted to perform an action that violates the compliance rule 136. Additionally, the enforcer 153 can perform a protective action, such as locks the client device 106 or erasing data from the client device 106. Furthermore, if the enforcer 153 detects that the target application 146 has attempted to perform an action that violates the compliance rule 136, the enforcer 153 can cause the target application 146 to be subjected to additional compliance rules 136.

Figure 4:
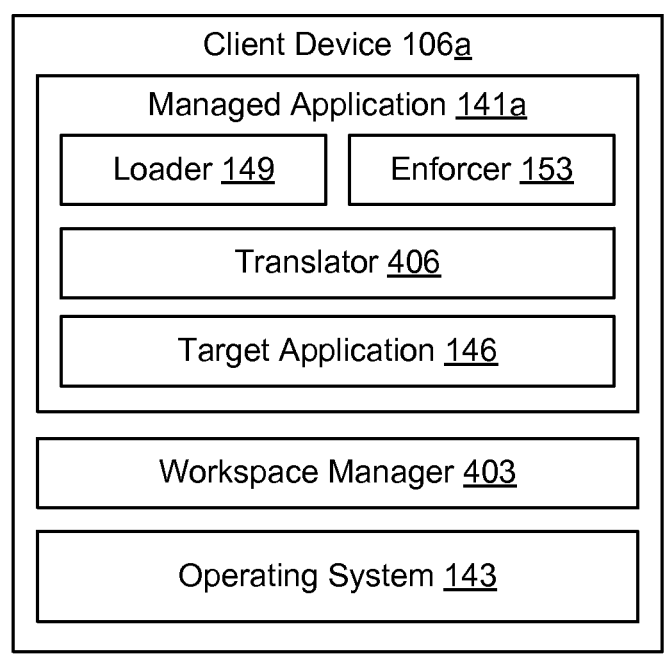
FIG. 4 is a drawing of an example of a client device.

With reference to FIG. 4, shown is another example of a client device 106, referred to herein at the client device 106a. The client device 106a shown in FIG. 4 can include the operating system 143, a workspace manager 403, and another example of a managed application 141, referred to herein as the managed application 141a.

The workspace manager 403 can create and manage a workspace in the client device 106. In some examples, a workspace can be regarded being as a virtual environment in which resources are isolated from other workspaces. For example, the workspace manager 403 can create and manage an enterprise workspace in which enterprise components, such as enterprise data and applications, operate in isolation from a personal workspace that is created and managed by a sandbox component of the operating system 143. As will be described in further detail below, the workspace manager 403 can monitor and manage components, such as applications, in the workspace that the workspace manager 403 creates.

The managed application 141a can include components that are similar to the managed application 141. For example, the managed application 141 a can include the loader 149, the enforcer 153, and the target application 146. In addition, the managed application 141a can include a translator 406. As will be described in further detail below, the translator 406 can intercept and modify messages to and from the target application 146. In addition, the translator 406 can communicate with the workspace manager 403.

Next, examples of the operation of the workspace manager 403 and the translator 406 are provided. The following description assumes that the workspace manager 403 and the managed application 141a have been installed and are executing in the client device 106a.

In some examples, the workspace manager 403 and the translator 406 can facilitate multiple instances of the target application 146 being executed in the client device 106a. For example, a first instance of the target application 146 can be executed in a personal workspace that is managed by a sandbox component of the operating system 143, and a second instance of the target application 146 can be executed under the management of the managed application 141a in an enterprise workspace that is controlled by the workspace manager 403. To this end, when the managed application package generator 123 creates the managed application package 126b for the managed application 141a, the managed application package generator 123 can modify some of the target application manifest data 336 in the managed application manifest file 309. In particular, the managed application package generator 123 can rename elements and attributes in the managed application manifest file 309 that are associated with package names, authorities of content providers, security permissions defined by the target application 146, account types, and non-system intent actions. An account type can be a category of an account, which can represent a user for a network service. A non-system intent action can be a messaging object that requests an action from a component that is not an operating system component.

When then managed application 141a executes in the client device 106 and causes the target application 146 to execute in the enterprise workspace using one or more of the approaches described above, the translator 406 can intercept messages between the target application 146 and components of the operating system 143. For example, the translator can intercept a message that another application has sent to the target application 146 through an interprocess communication service of the operating system 143. As another example, the translator can intercept a request from the target application 146 to perform an action.

When the translator 406 intercepts a message between the target application 146 and a component of the operating system 143, the translator 406 can modify object identifiers in the message for package names, authorities of content providers, security permissions defined by the target application 146, account types, and non-system intent actions. In various examples, the translator 406 can modify identifiers for these elements by adding a string to the identifiers or by removing a string from the identifiers. For instance, if the target application 146 intercepts a message sent by the target application 146 that includes an identifier "X," the translator 406 can concatenate the string "com.enterprise.workspace-.app." to the "X" identifier in the message so that the resulting identifier for the message provided to the operating system 143 is "com.enterprise.workspace.app.X." As another example, if the target application 146 intercepts a message sent by a component of the operating system 143 that includes the identifier "com.enterprise.workspace.app.X," the translator 406 can remove the string "com.enterprise-.workspace.app" from the identifier so that the resulting identifier for the message provided to the target application 146 is "X." By the translator 406 renaming the identifiers in messages between the operating system 143 and the target application 146, one instance of the target application 146 can be executed under the management of the managed application 141 a at the same time that another instance of the target application 146 executes in the client device 106.

In some examples, the operating system 143 can provide sandboxing functionality so that one application cannot access the data in the private storage of another application. For examples involving the ANDROID operating system, the sandbox can isolate data between applications. This sandboxing functionality can prevent a component in the personal workspace of the client device 106 from accessing data for the target application 146 operating in the enterprise workspace controlled by the workspace manager 403.

In some examples involving the ANDROID operating system, the operating system 143 may not restrict components in the personal workspace from accessing data for the target application 146 that is stored in removable storage for the client device 106, such as data that is stored in a SECURE DIGITAL (SD) memory card. Because the operating system 143 in these examples does not restrict this access, the translator 406 can encrypt and decrypt data stored in the removable storage so that components in the personal workspace cannot process data in the removable storage for the target application 146. For example, the translator 406 can intercept a request from the target application 146 to store a file in an SD memory card for the client device 106. Upon intercepting the request, the translator 406 can encrypt the file and then transmit a request to store the encrypted file in the SD memory card. By storing an encrypted version of the file in the removable storage, components in the personal workspace of the client device 106 cannot process the content in the file.

The translator 406 can also intercept a request from the target application 146 for a file stored in an SD memory card for the client device 106. If the file was encrypted and stored by the translator 406, the translator can obtain the encrypted file and then decrypt the file. The translator 406 can then provide the decrypted file to the target application 146. By intercepting these requests and encrypting and decrypting the file for the removable storage, the translator 406 can facilitate the target application 146 processing the file while preventing components in the personal workspace of the client device 106 from processing the file.

In some examples, the operating system 143 can facilitate one application in the client device 106 communicating and interacting with a component in another application. For examples involving the ANDROID operating system, the operating system 143 can include an activity manager that facilitates an application invoking a component, such as an activity, service, broadcast receiver, or content provider, in another application. If an application transmits a message that invokes a component in the target application 146, the translator 406 can intercept the component invocation message and forward the message to the workspace manager 403. The workspace manager 403 can then determine whether an application in the enterprise workspace originated the component invocation message. If an application in the enterprise workspace originated the message, the workspace manager 403 can instruct the translator 406 to forward the message to the target application 146. Otherwise, if an application in the personal workspace originated the message, the workspace manager 403 can instruct the translator 406 to discard the message so that the target application 146 does not receive the message. In this way, the translator 406 and the workspace manager 403 can prevent a component outside of the enterprise workspace from interacting with or controlling a component in the enterprise workspace.

In some examples, the workspace manager 403 can provide a clipboard component that can facilitate cut, copy, and paste operations within or between applications in the enterprise workspace that is managed by the workspace manager 403. To implement such a clipboard operation, the translator 406 can intercept clipboard messages associated with the target application 146 and forward the messages to the workspace manager 403. The workspace manager 403 can then determine whether the target application 146 has requested to perform a cut, copy, or paste command. If the target application 146 has requested to perform a cut command, content that the user has selected can be removed from the target application 146 and stored in the clipboard component of the workspace manager 403 for later use. If the target application 146 has requested to perform a copy command, content that the user has selected can be copied from the target application 146 and stored in the clipboard component of the workspace manager 403 for later use. Data that has been cut or copied can also be encrypted to further restrict access to only enterprise applications. If the target application 146 has requested to perform a paste command, the clipboard component can optionally decrypt and provide content that was previously stored in the clipboard component to the target application 146, which can insert the content at a location selected by a user. Because the clipboard component in the workspace manager 403 processes the clipboard operation requests, the target application 146 cannot copy content from the enterprise workspace to a component in the private workspace. In addition, the workspace manager 403 prevents a component in the enterprise workspace from obtaining and copying content that originated from the private workspace.

In some examples, the workspace manager 403 can provide a search manager that processes searches requested by the target application 146. For example, the target application 146 can request a list of search results that match a particular search query. To implement this functionality, the translator 406 can intercept a message from the target application 146 requesting a search to be performed. The translator 406 can forward the request to the search manager in the workspace manager 403, and the search manager can generate search results based on the search query. The search performed by the search manager can be limited to a search of resources within the enterprise workspace. The search manager can generate search results and then provide the search results to the target application 146. By intercepting search requests from the target application 146 and having the search manager in the workspace manager 403 process the search, the search component can provide only resources within the enterprise workspace to the target application 146. While several examples of restricting data usage and operation have been given, the workspace manager 403 can also separate and restrict other device behavior between the personal and enterprise workspaces.

Figure 5:
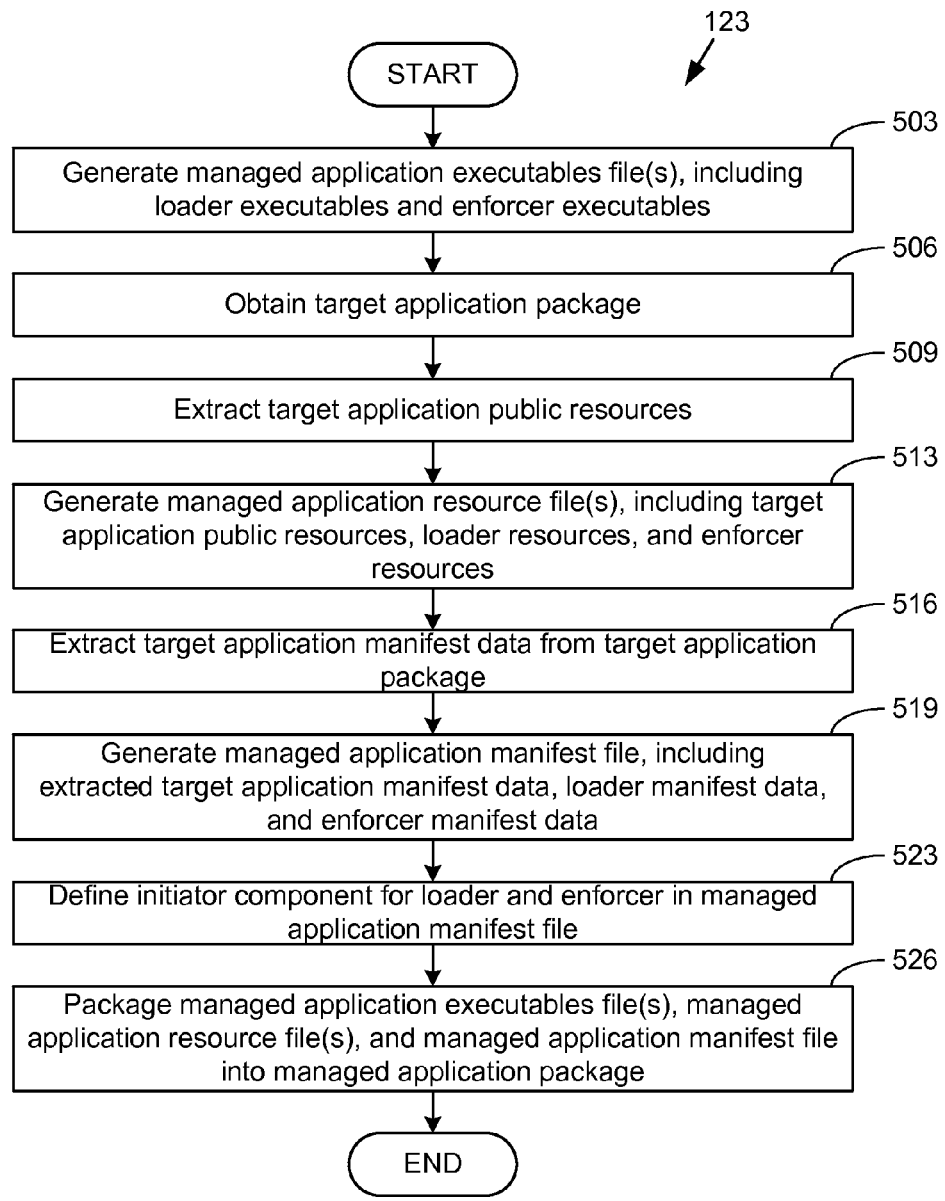
FIG. 5 is a flowchart illustrating an example of functionality implemented by a managed application generator in an enterprise computing environment.

With reference to FIG. 5, shown is a flowchart that provides an example of a portion of the operation of the managed application package generator 123. In particular, FIG. 5 provides an example of the managed application package generator 123 obtaining a target application package 126*a* and generating a managed application package 126*b* for the managed application 141. Additionally, the flowchart of FIG. 5 can be viewed as depicting an example of steps of a method implemented in a computing device of the enterprise computing environment 103.

Beginning with step 503, the managed application package generator 123 can create the managed application executables file 303 for the managed application package 126*b*. In some examples, the managed application executables file 303 can be a "binaries" file that includes JAVA bytecode as well as native code. The managed application executables file 303 can include the loader executables 313 and the enforcer executables 316.

At step 506, the managed application package generator 123 can obtain a target application package 126*a*. In one example, the managed application packaged generator 123 can obtain the target application package 126*a* from the application repository 139. As discussed above, the target application package 126*a* can include a target application resource file 206, which can include public resources for the target application. At step 509, the managed application package generator 123 can extract the public resources from the target application package 126*a*.

The managed application package generator 123 can then move to step 513 and generate the managed application resource file 306 for the managed application package 126*b*. For example, the managed application resource file 306 can include loader resources 319 and enforcer resources 323 that are used to execute the loader 149 and the enforcer 153, respectively. In addition, the managed application resource file 306 can include target application public resources 326, which can include the public resources extracted from the target application resource file 206. For example, the managed application generator 123 can include the launcher icon for the target application 146 in the managed application resource file 306.

At step 516, the managed application package generator 123 can extract the target application manifest data 336 from the target application manifest file 290 in the target application package 126*a*. In step 519, the managed application package generator 123 can then generate the managed application manifest file 309. For examples involving the ANDROID operating system, the managed application manifest file 309 can be an AndroidManifest.xml file. The managed application manifest file 309 can include the target application manifest data 336 extracted from the target application package 126*a*, the loader manifest data 329, and the enforcer manifest data 333.

As indicated at step 523, the managed application package generator 123 can define the initiator component, which loads the loader 149 and the enforcer 153, in the managed application manifest file 309. As discussed above, the initiator component can be the first component of the managed application 141 that is executed when the managed application 141 begins executing. For examples involving the ANDROID operating system, the initiator component can be defined in the AndroidManifest.xml file as a subclass of the android.app.Application class in the android:name attributes of the <application> tag.

The managed application package generator 123 can then move to step 526 and package the managed application executables file 303, the managed application resource file 306, and the managed application manifest file 309 in the managed application package 126*b*. For examples involving the ANDROID operating system, the managed application package 126*b* can be an APK file. After the managed application package generator 123 generates the managed application package 126*b*, the process ends. The management system 119 can then provide the generated managed application package 126*b* to a client device 106, as described above.

Figure 6:
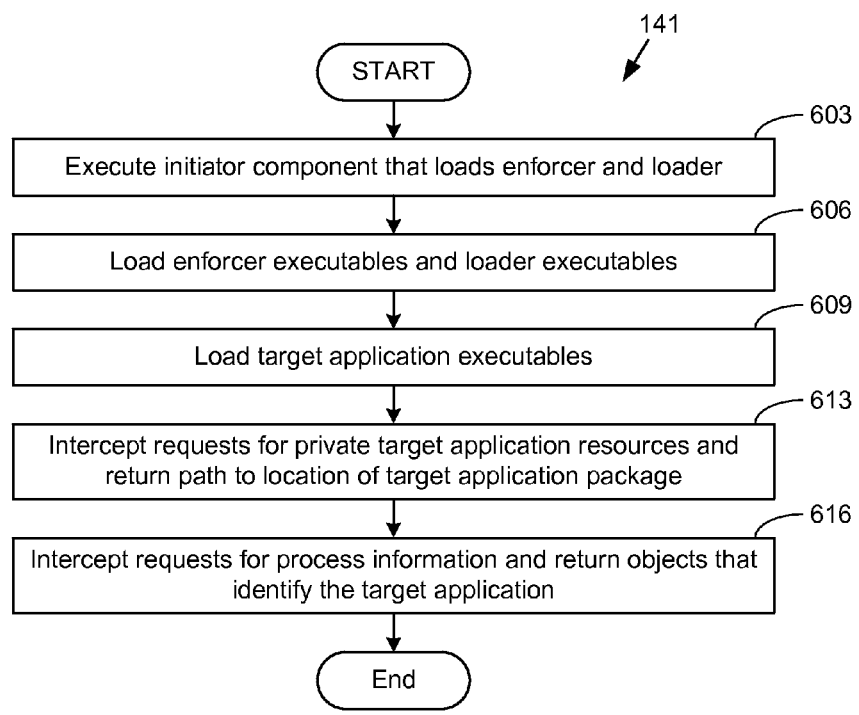
FIG. 6 is a flowchart illustrating an example of functionality implemented by a managed application in a client device.

With reference to FIG. 6, shown is a flowchart that provides an example of a portion of the operation of the managed application 141. In particular, FIG. 6 provides an example of the managed application 141 executing and causing the target application 146 to execute in the client device 106. Additionally, the flowchart of FIG. 6 may be viewed as depicting an example of steps of a method implemented in the client device 106.

Beginning with step 603, the managed application 141 can execute the initiator component that loads the enforcer 153 and the loader 149. For examples involving the ANDROID operating system, the initiator component can include a subclass of the android.app.Application class that is defined in the android:name attributes of the <application> tag in the AndroidManifest.xml file. When the managed application 141 begins executing in the client device 106, this subclass can be the first component that the managed application 141 instantiates.

As shown at step 606, the managed application 141 can load the enforcer executables 316 and the loader executables 313 into memory in the client device 106. The managed application 141 can then move to step 609 and load the executables for the target application 146 from the target application executables file 203. For examples involving the ANDROID operating system, the managed application 141 can load the executables of the target application 146 by creating a class loader object, such as a global java.lang.ClassLoader object, that loads the executables in the target application executables file 203 through the dalvik.system.DexClassLoader class loader.

When the executables for the target application 146 have been loaded into the memory of the client device 106, the target application 146 can request access to private resources in the target application resource file 206. However, the target application 141 may not have information that specifies the location where the private resources are stored. As such, at step 613, the managed application 141 can intercept these requests for private target application resources and return to the target application 146 a path to the storage location of the target application package 126*a*. For examples involving the ANDROID operating system, the path to the storage location can include the "/data/app/" directory for the client device 106.

When the target application 146 is executing, the target application 146 can request process information for itself. For examples involving the ANDROID operating system, the target application 146 can issue the android.app.Activity.getApplication, android.app.Service.getApplication, or android.app.ContexImpl.getApplicationContext calls. As indicated at step 616, the managed application 141 can intercept these requests for process information and return objects that identify the target application 146. Thereafter, the process ends.

Figure 7:
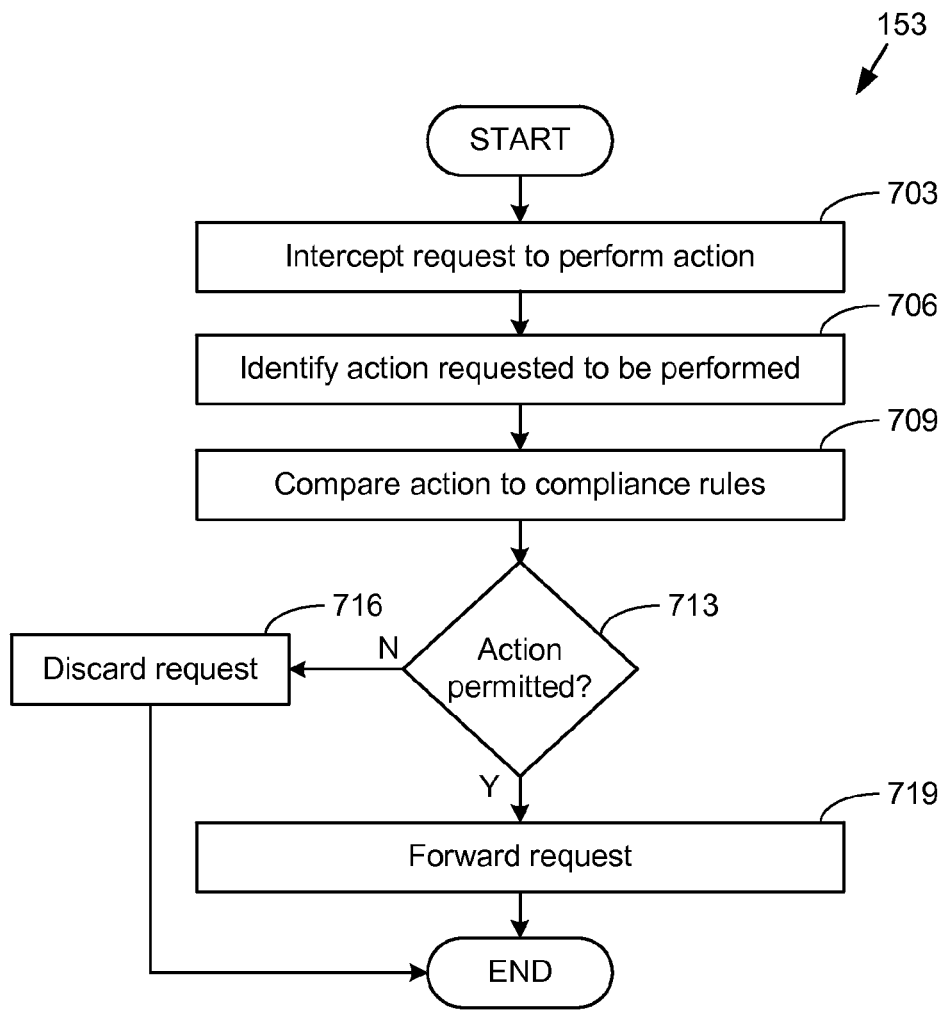
FIG. 7 is a flowchart illustrating an example of functionality implemented by an enforcer in a managed application.

With reference to FIG. 7, shown is a flowchart that provides an example of a portion of the operation of the enforcer 153. In particular, FIG. 7 provides an example of the enforcer 153 intercepting requests by the target application 146 to perform an action and determining whether to permit the requested action based on the compliance rules 136 assigned to the client device 106. Additionally, the flowchart of FIG. 7 can be viewed as depicting an example of steps of a method implemented in the client device 106.

Beginning with step 703, the enforcer 153 can intercept a request by the target application 146 to perform an action. As an example that involves the ANDROID operating system, the enforcer 153 can intercept a java.io.File.delete call that the target application 146 has issued requesting to delete a particular file in the client device 106. At step 706, the enforcer 153 can identify the action that the target application 146 is requesting to be performed. For example, if the enforcer 153 has intercepted the java.io.File.delete call, the enforcer 153 can detect that the call is requesting to delete a file. In addition, the enforcer 153 can parse the call message to extract a parameter in the call that identifies the particular file that the target application 146 is requesting to delete.

As indicated at step 709, the enforcer 153 can then compare the request to the compliance rules 136 that are assigned to the client device 106. In some examples, the compliance rules 136 can specify whether a component in the client device 106 is prohibited from performing one or more actions. For example, a compliance rule 136 can specify whether a component in a client device 106 is permitted to request access to an image library in the client device 106. As shown at step 713, the enforcer 153 can then determine whether the target application 146 is permitted to perform the identified action.

If the enforcer 153 determines that the target application 146 is not permitted to perform the action, the enforcer 153 can discard the request, as shown at step 716. In examples involving the ANDROID operating system, the enforcer 153 can discard the request by returning a "false" object to the target application 146, which indicates to the target application 146 that the requested action has failed.

Otherwise, if the enforcer 153 determines that the target application 146 is permitted to perform the request, the enforcer 153 can forward the request to perform the operation to the operating system 143, as indicated at step 719. Thus, by either discarding or forwarding the request, the enforcer 153 can ensure the target application is operating in compliance with the compliance rules 136 assigned to the client device 106. After step 719, the process ends.

Figure 8:
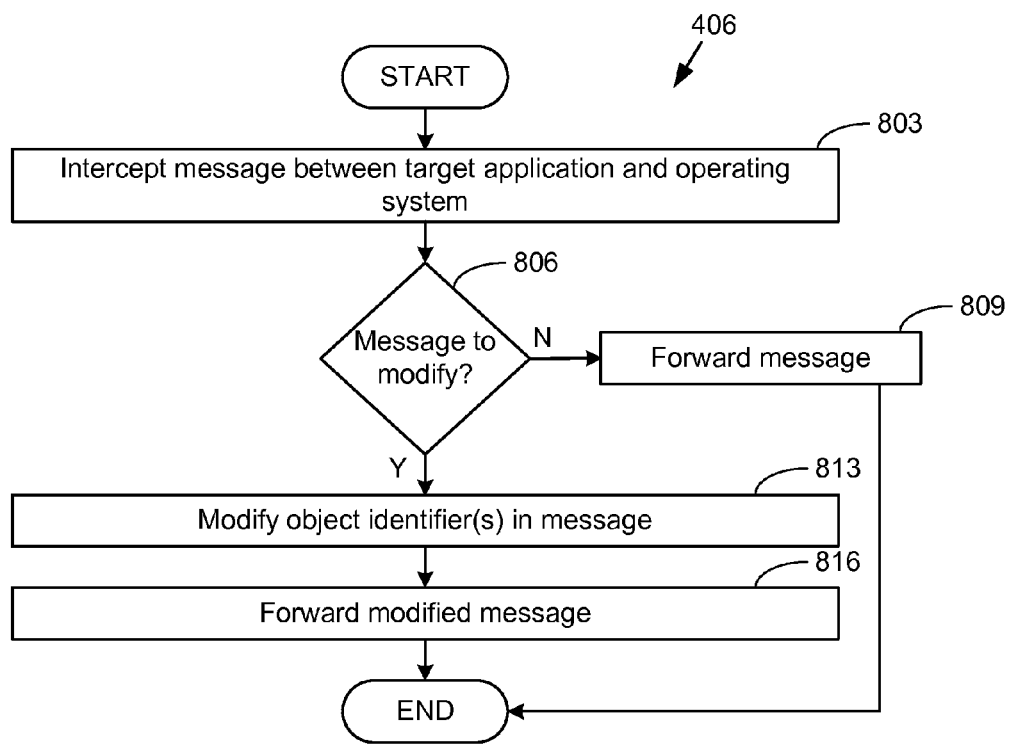
FIGS. 8-9 are flowcharts illustrating examples of functionality implemented by a translator in a managed application.

With reference to FIG. 8, shown is a flowchart that provides an example of a portion of the operation of the translator 406. In particular, FIG. 8 provides an example of the translator intercepting a message between the target application 146 and the operating system 143, and the translator 406 forwarding the intercepted message or a modified version of the intercepted message. Additionally, the flowchart of FIG. 8 can be viewed as depicting an example of steps of a method implemented in the client device 106*a*.

Beginning with step 803, the translator 406 can intercept a message between the target application 146 and the operating system 143. In one example, the target application 146 can send the message that the translator 406 intercepts. In another example, the operating system 143 can send the message that the translator 406 intercepts.

At step 806, the translator 406 can determine whether the intercepted message is a message that the translator 406 should modify. Examples of messages that the translator 406 should modify include messages that include package names, authorities of content providers, security permissions defined by the target application 146, account types, and non-system intent actions. If the translator 406 determines that the intercepted message is a message that the translator 406 should not modify, the translator 406 can forward the intercepted message to the originally intended destination, as shown at step 809. For example, if the target application 146 sent the intercepted message, the translator 406 can forward the message to the operating system 143. If the operating system 143 sent the intercepted message, the translator 406 can forward the message to the target application 146. After step 809, the process ends.

If, at step 806, the translator 406 determines that the intercepted message is a message that should be modified, the translator 406 can move to step 813 and modify the message. In particular, the translator 406 can modify object identifiers in the message. For instance, if the target application 146 intercepts a message sent by the target application 146 that includes an object identifier "X," the translator 406 can concatenate the string "com.enterprise.workspace.app." to the "X" identifier in the message so that the resulting object identifier for the message provided to the operating system 143 is "com.enterprise.workspace.app.X." As another example, if the target application 146 intercepts a message sent by a component of the operating system 143 that includes the object identifier "com.enterprise.workspace.app.X," the translator 406 can remove the string "com.enterprise.workspace.app" from the identifier so that the resulting object identifier for the message provided to the target application 146 is "X."

As shown at step 816, the translator 406 can then forward the modified message to the originally intended destination. For example, if the target application 146 sent the intercepted message, the translator 406 can forward the modified message to the operating system 143. If the operating system 143 sent the intercepted message, the translator 406 can forward the message to the target application 146. After step 816, the process ends.

Figure 9:
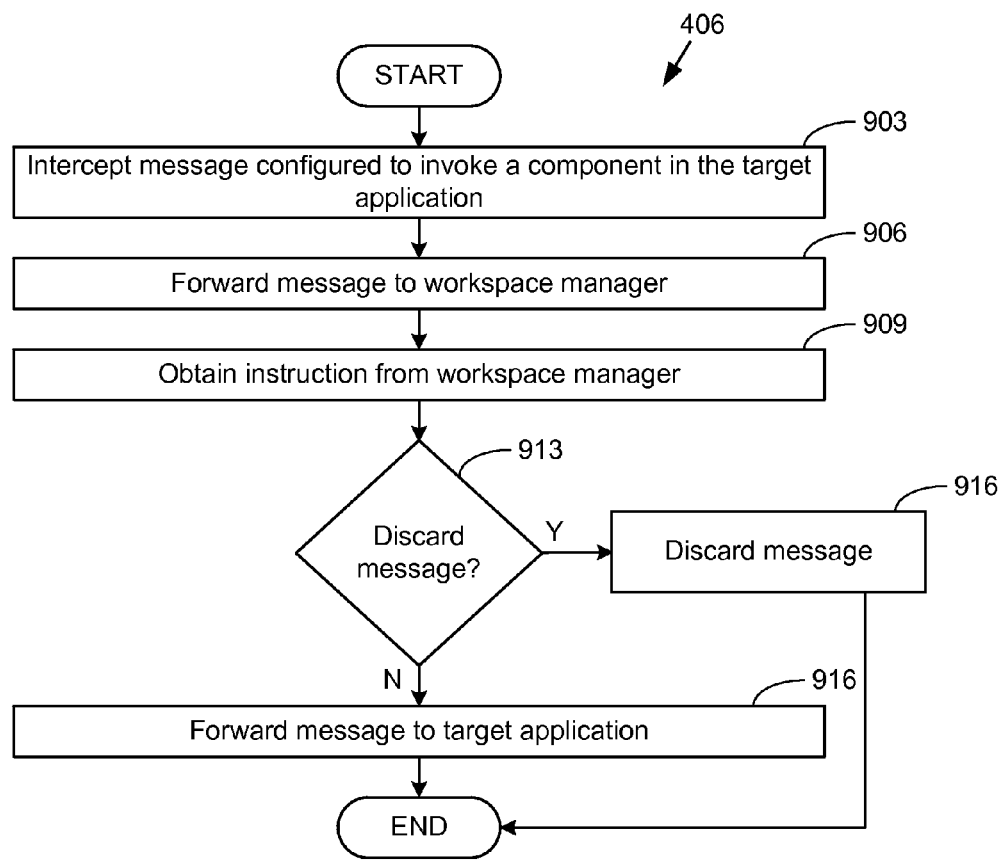

With reference to FIG. 9, shown is a flowchart that provides another example of a portion of the operation of the translator 406. In particular, FIG. 9 provides an example of the translator 406 processing a message that invokes a component in the target application 146. Additionally, the flowchart of FIG. 9 can be viewed as depicting an example of steps of a method implemented in the client device 106a.

Beginning with step 903, the translator 406 can intercept a message from the operating system 143 that invokes a component in the target application 146. As an example that involves the ANDROID operating system, the message can invoke an activity, service, broadcast receiver, or content provider of the target application 146.

As shown at step 906, the translator 406 can forward the intercepted message to the workspace manager 403 in the client device 106a. The translator 406 can then move to step 909 and obtain an instruction from the workspace manager 403. The instruction received by the translator 406 can specify whether the translator 406 should discard the intercepted message or forward the intercepted message to the target application 146.

At step 913, the translator 406 can determine whether the received instruction specifies that the translator 406 should discard the intercepted message. If the instruction specifies that the translator 406 should discard the intercepted message, the translator 406 can move to step 916 and discard the message. Otherwise, if the instruction from the workspace manager 403 specifies that the translator 406 should not discard the message, the translator 406 can forward the intercepted message to the target application 146 at step 916. After step 916, the process ends.

Figure 10:
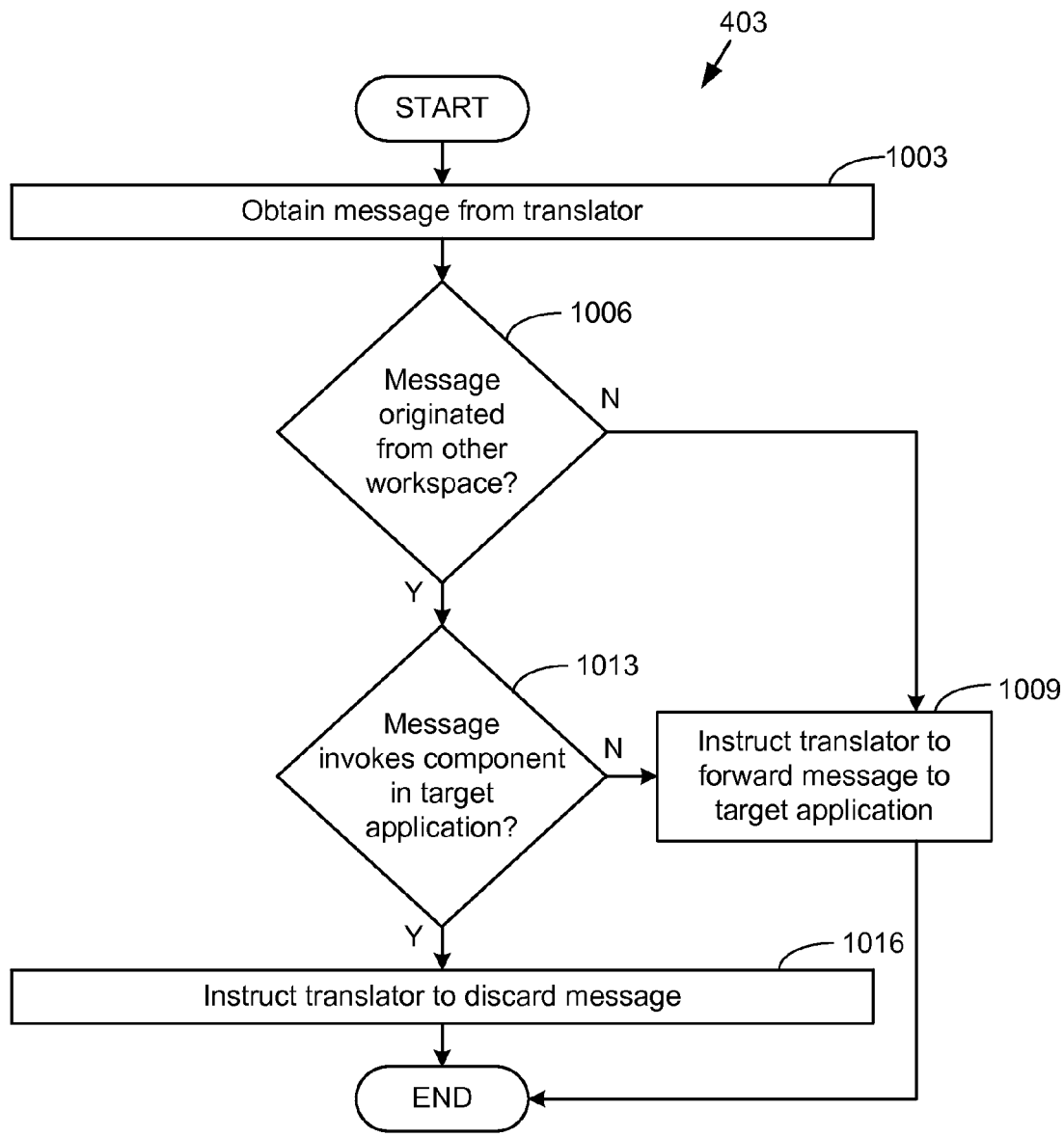
FIG. 10 is a flowchart illustrating an example of functionality implemented by a workspace manager in a client device.

With reference to FIG. 10, shown is a flowchart that provides an example of a portion of the operation of the workspace manager 403. In particular, FIG. 10 provides an example of the workspace manager 403 instructing the translator 406 whether to discard a message that invokes a component in the target application 146. Additionally, the flowchart of FIG. 10 can be viewed as depicting an example of steps of a method implemented in the client device 106a.

Beginning with step 1003, the workspace manager 403 can obtain a message from the translator 406. This message can be a message that the translator 406 provided at step 906 in FIG. 9. At step 1006, the workspace manager 403 determines whether the message originated from a workspace other than the workspace managed by the workspace manager 403. If the message did not originate from the other workspace, the workspace manager 403 can move to step 1009 and instruct the translator to forward the message to the target application 146.

Otherwise, if the message did originate from the other workspace, the workspace manager 403 moves to step 1013 and determines whether the message is configured to invoke a component in the target application 146. If the message is not configured to invoke a component in the target application 146, the workspace manager 403 can instruct the translator 406 to forward the message to the target application 146, as indicated at step 1009.

If the message is configured to invoke a component in the target application 146, the workspace manger 403 can move to step 1016 and instruct the translator 406 to discard the message. In this way, the workspace manager 403 can prevent a component outside the workspace managed by the workspace manager 403 from interacting with or controlling the target application 146. After step 1009 or step 1016, the process ends.

Figure 11:
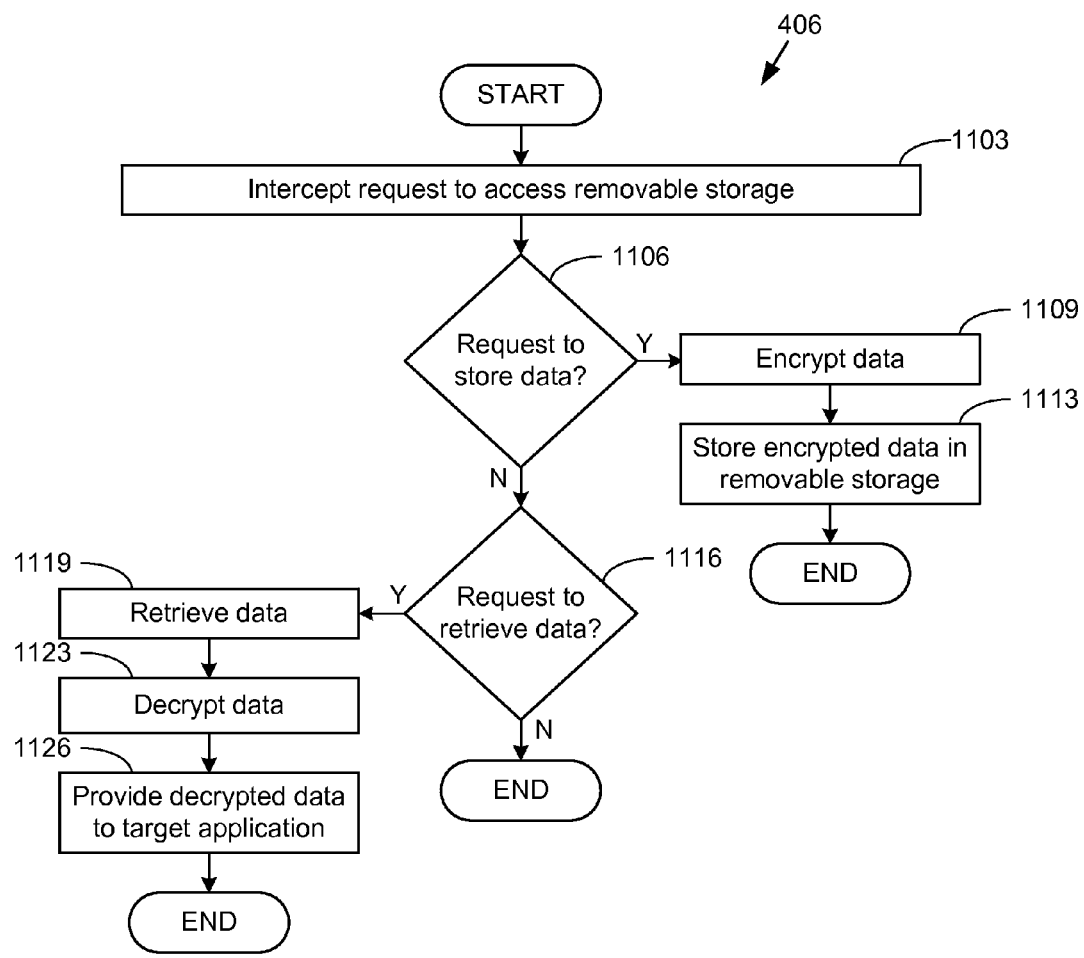
FIGS. 11-12 are flowcharts illustrating examples of functionality implemented by a translator in a managed application.

With reference to FIG. 11, shown is a flowchart that provides another example of a portion of the operation of the translator 406. In particular, FIG. 11 provides an example of the translator 406 encrypting data being stored in removable storage and decrypting data being retrieved from removable storage. Additionally, the flowchart of FIG. 11 can be viewed as depicting an example of steps of a method implemented in the client device 106a.

Beginning with step 1103, the translator 406 can intercept a request from the target application 146 to access removable storage in the client device 106a. In one example, the removable storage can include an SD memory card. In step 1106, the translator 406 can determine whether the intercepted request is a request to store data in the removable storage.

If the translator 406 determines that the intercepted request is a request to store data in the removable storage, the translator 406 can move to step 1109 and encrypt the data that the target application 146 has requested to store. As indicated at step 1113, the translator 406 can then store the encrypted data in the removable storage. After step 1113, the process ends.

If, at step 1106, the translator 406 determines that the intercepted request is not a request to store data, the translator 406 can move to step 1116 and determine whether the intercepted request is a request to retrieve data from the removable storage. If not, the process ends after step 1116.

Otherwise, if the intercepted request is a request from the target application 146 to retrieve data from the removable storage, the translator 406 can move to step 1119 and retrieve the requested data from the removable storage. The data that the translator 406 retrieves from the removable storage can be encrypted so that components cannot process the data without a decryption key. As such, as indicated at step 1123, the translator 406 can decrypt the retrieved data. The translator 409 can then move to step 1126 and provide the decrypted data to the target application 146. Thereafter, the process ends.

Figure 12:
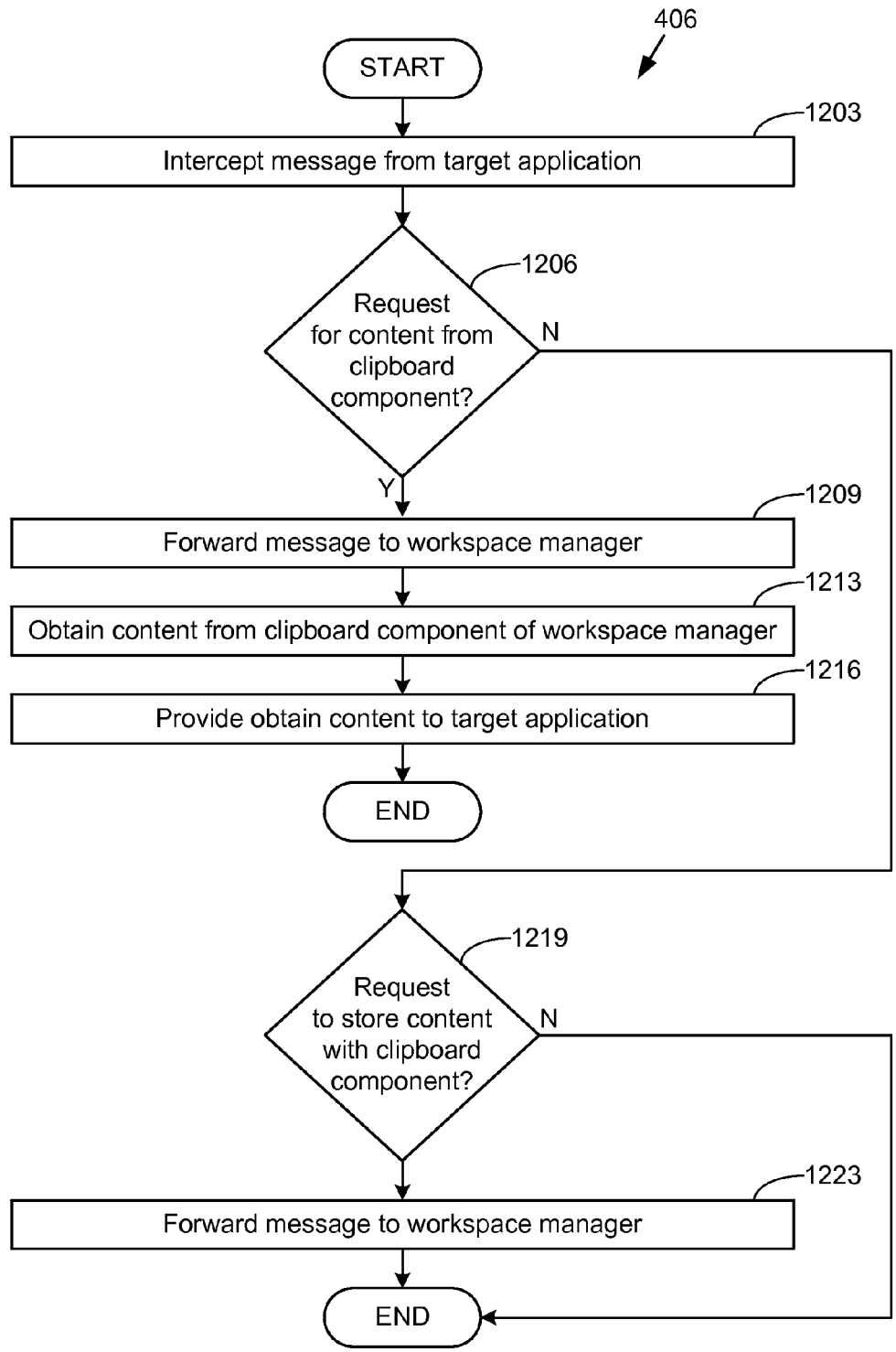

With reference to FIG. 12, shown is a flowchart that provides another example of a portion of the operation of the translator 406. In particular, FIG. 12 provides an example of the translator 406 processing a clipboard operation requested by the target application 146. Additionally, the flowchart of FIG. 12 can be viewed as depicting an example of steps of a method implemented in the client device 106*a*.

Beginning with step 1203, the translator 406 can intercept a message sent from the target application 146. At step 1206, the translator 406 can determine whether the message is a request for content from a clipboard component in the operating system 143. For examples involving the ANDROID operating system, the clipboard component can include the ANDROID clipboard manager, and the request for content can be a paste operation request that was issued in response to a user initiating a paste operation.

If, at step 1206, the translator 406 determines that the message is a request for clipboard content, the translator 406 can move to step 1209 and forward the message to the workspace manager 403. The translator 406 can then obtain clipboard content from the clipboard component of the workspace manager 403, as shown at step 1213. The obtained clipboard content can include text or graphics content. At step 1216, the translator 406 can then provide the clipboard content that was obtained at step 1216 to the target application 146. After step 1216, the process ends.

If, at step 1206, the translator 406 determines that the message intercepted at step 1203 is not a request for clipboard content, the translator 406 can move to step 1219 and determine if the intercepted message is a request to store content with the clipboard component in the operating system 143. Such a request could include a cut or a copy operation request that was issued in response to a user initiating a cut or copy operation. If the translator 406 determines that the intercepted message is not a request to store content with the clipboard component in the operating system 143, the process ends.

Otherwise, if the translator 406 determines that the intercepted message is a request to store content with the clipboard component in the operating system 143, the translator 406 can move to step 1223 and forward the intercepted message to the workspace manager 403. By forwarding the intercepted request to store clipboard content to the workspace manager 403 instead of to the clipboard component of the operating system 143, the workspace manager 403 can store the clipboard content for later use.

Figure 13:
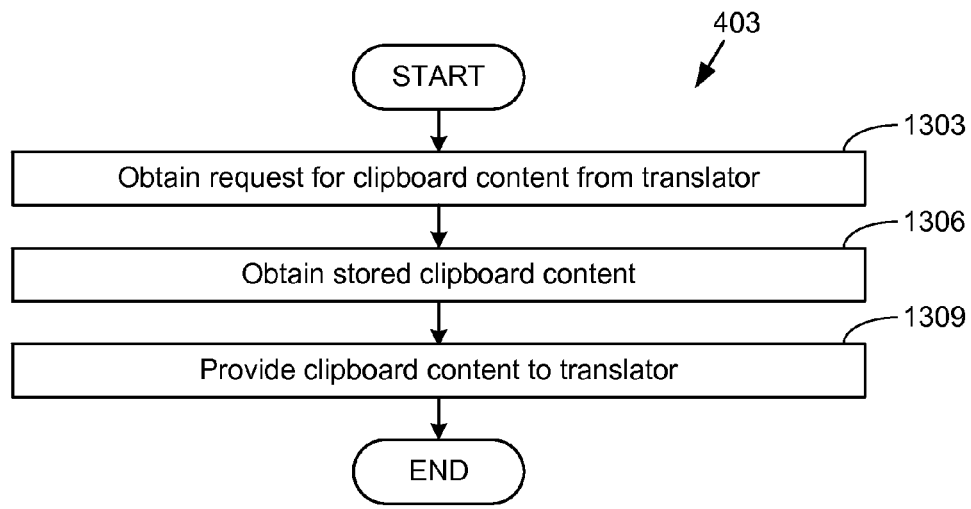
FIGS. 13-14 are flowcharts illustrating examples of functionality implemented by a workspace manager in a client device.
Figure 14:
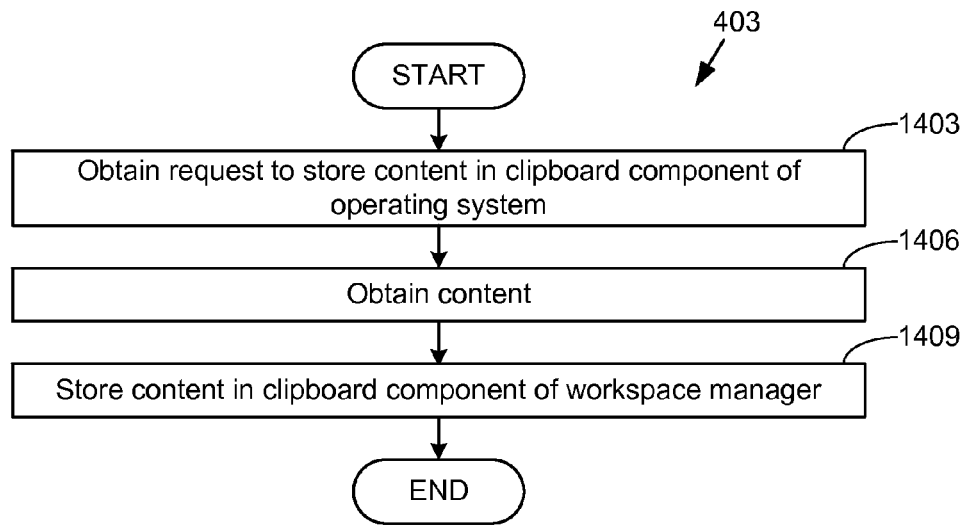

With reference to FIG. 13, shown is a flowchart that provides an example of a portion of the operation of the workspace manager 403. In particular, FIG. 14 provides an example of the workspace manager 403 processing a request from the translator 406 for clipboard content. Additionally, the flowchart of FIG. 13 can be viewed as depicting an example of steps of a method implemented in the client device 106*a*.

Beginning with step 1303, the workspace manager 403 can obtain a request for clipboard content from the translator 406. The translator 406 can send this request in step 1209 of FIG. 12, for example.

As shown at step 1306, the workspace manager 403 can then obtain clipboard content that was previously stored by the workspace manager 403. The workspace manager 403 can then move to step 1309 and provide the clipboard content to the translator 406 in the managed application 141*a*. After step 1309, the process ends.

With reference to FIG. 14, shown is a flowchart that provides another example of a portion of the operation of the workspace manager 403. In particular, FIG. 14 provides an example of the workspace manager 403 processing a request from the translator 406 to store clipboard content. Additionally, the flowchart of FIG. 14 can be viewed as depicting an example of steps of a method implemented in the client device 106*a*.

Beginning with step 1403, the workspace manager 403 can obtain a request from the translator 406 to store content in the clipboard component of the operating system 143. The translator 406 can send this request in step 1219 of FIG. 12, for example. As shown at step 1406, the workspace manager 403 can then obtain the content that the translator 406 has requested to be stored. In some examples, the content is included in the message that requests the content to be stored.

The workspace manager 403 can then move to step 1409 and store the content in the clipboard component of the workspace manager 403. By the workspace manager 403 storing the content in the clipboard component of the workspace manager 403, applications in the workspace that are not managed by the workspace manager 403 cannot access the stored content. After step 1409, the process ends.

The flowcharts of FIGS. 5-14 show examples of the functionality and operation of implementations of components described herein. The components of the networked environment 100 described herein can be embodied in hardware, software, or a combination of hardware and software. If embodied in software, each step in the flowcharts of FIGS. 5-14 can represent a module or a portion of code that comprises computer instructions to implement the specified logical functions. The computer instructions can be embodied in the form of source code that comprises human-readable statements written in a programming language or machine code that comprises machine instructions recognizable by a suitable execution system, such as a processor in a computer system or other system. If embodied in hardware, each step can represent a circuit or a number of interconnected circuits that implement the specified logical functions.

Although the flowcharts show a specific order of execution, it is understood that the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid. All such variations are within the scope of the present disclosure.

The enterprise computing environment 103, the client device 106, the client device 106*a*, and other components described herein can each include at least one processing circuit. Such a processing circuit can comprise one or more processors and one or more storage devices that are coupled to a local interface. The local interface can comprise a data bus with an accompanying address/control bus.

A storage device for a processing circuit can store data and components that are executable by the one or more processors of the processing circuit. In some examples, the management system 119, the managed application 141, the managed application 141a, and the workspace manager 403 can be stored in one or more storage devices and be executable by one or more processors. Also, the data store 116 can be located in the one or more storage devices.

The management system 119, the managed application 141, the managed application 141a, the workspace manager 403, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, one or more microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more of the components described herein that comprise software or computer instructions can be embodied in any non-transitory computer-readable medium for use by or in connection with an instruction execution system such as, for example, a processor in a computer system or other system. Such a computer-readable medium can contain, store, and maintain the software or computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A method, comprising:
receiving, by a computing device, a managed application package generated by an enterprise computing environment, the managed application package comprising a managed application, a target application, and target application resources for the target application;
executing, by the computing device, the managed application according to the managed application package, the managed application comprising a target application loader;
initiating, by the target application loader of the managed application, an execution of the target application in the computing device according to the managed application package;
intercepting, by the target application loader, a request from the target application for access to the target application resources and returning a path to a storage location on the computing device for the target application resources in response to the request; and
determining, by the managed application, whether the execution of the target application complies with a compliance rule specified remotely by the enterprise computing environment.

2. The method of claim 1, further comprising:
intercepting, by the managed application, a request from the target application for process information; and
returning, by the managed application, a target application object to the target application responsive to the request from the target application.

3. The method of claim 1, wherein:
executing the managed application comprises loading the target application loader of the managed application and a compliance rule enforcer of the managed application; and
the compliance rule enforcer determines whether the execution of the target application complies with the compliance rule.

4. The method of claim 1, wherein initiating the execution of the target application in the computing device comprises:
requesting, by the target application loader of the managed application, to load a plurality of executables of the target application into memory of the computing device.

5. The method of claim 1, wherein determining whether the execution of the target application complies with the compliance rule comprises:
obtaining, by the managed application, a request from the target application to perform an action; and
determining whether the action is permitted by the compliance rule.

6. The method of claim 5, further comprising discarding, by the managed application, the request upon determining that the action is not permitted by the compliance rule.

7. The method of claim 5, further comprising, forwarding, by the managed application, the request to an operating system of the computing device upon determining that the action is permitted by the compliance rule.

8. A non-transitory computer-readable medium storing a plurality of computer instructions executable by a computing device, the plurality of computer instructions being configured to cause the computing device to at least:
receive a managed application package generated by an enterprise computing environment, the managed application package comprising a managed application, a target application, and target application resources for the target application;
execute the managed application according to the managed application package, the managed application comprising a target application loader;
initiate, by the target application loader of the managed application, an execution of the target application in the computing device according to the managed application package;
intercept, by the target application loader, a request from the target application for access to the target application resources and return a path to a storage location on the computing device for the target application resources in response to the request;
identify, by the managed application, a request for an action to be performed by the target application; and determine, by the managed application, whether the action requested to be performed by the target application is permitted by a compliance rule specified remotely by the enterprise computing environment.

9. The non-transitory computer-readable medium of claim 8, wherein the plurality of computer instructions are further configured to cause the computing device to at least discard the request upon determining that the action is not permitted by the compliance rule.

10. The non-transitory computer-readable medium of claim 8, wherein the plurality of computer instructions are further configured to cause the computing device to at least return an object to the target application upon determining that the action is not permitted by the compliance rule, wherein the object indicates a failure of the action.

11. The non-transitory computer-readable medium of claim 10, wherein the plurality of computer instructions are further configured to cause the computing device to at least forward the request upon determining that the action is permitted by the compliance rule.

12. The non-transitory computer-readable medium of claim 8, wherein the plurality of computer instructions are further configured to cause the computing device to at least:
intercept a request from the target application for process information; and
return a target application object to the target application responsive to the request from the target application.

13. The non-transitory computer-readable medium of claim 8, wherein the plurality of computer instructions are further configured to cause the computing device to at least:
request, by the target application loader of the managed application, to load a plurality of executables of the target application into memory of the computing device
intercept a request by the target application for a private target application resource; and
return a path to a storage location of a package for the target application.

14. A system, comprising:
a memory device to store a managed application package generated by an enterprise computing environment, the managed application package comprising a managed application, a target application, and target application resources for the target application; and
a computing device configured, through execution of the managed application, to at least:
initiate, by a target application loader of the managed application, an execution of the target application in the computing device according to the managed application package;
intercept, by the target application loader, a request from the target application for access to the target application resources and return a path to a storage location on the computing device for the target application resources in response to the request;
obtain a request from the target application to perform an action; and
determine whether the action is permitted by a compliance rule specified remotely by the enterprise computing environment.

15. The system of claim 14, wherein the managed application is further configured to cause the computing device to at least discard the request upon determining that the action is not permitted by the compliance rule.

16. The system of claim 14, wherein the managed application is further configured to cause the computing device to discard the request by at least returning a failure object to the target application.

17. The system of claim 14, wherein the managed application is further configured to cause the computing device to at least forward the request upon determining that the action is permitted by the compliance rule.

18. The system of claim 14, wherein the managed application is further configured to cause the computing device to at least:
intercept a request from the target application for process information; and
return an object for the target application responsive to the request from the target application.

19. The system of claim 14, wherein the managed application further comprises a compliance rule enforcer to determine whether the action is permitted by the compliance rule.

20. The system of claim 19, wherein the managed application package further includes loader resources for the target application loader and enforcer resources for the compliance rule enforcer.

* * * * *